United States Patent
Ghalam et al.

(10) Patent No.: US 12,074,948 B1
(45) Date of Patent: Aug. 27, 2024

(54) DISTRIBUTED AND FEDERATED RADIO ACCESS NETWORK CONFIGURATION MANAGEMENT

(71) Applicant: Dell Products L.P., Round Rock, TX (US)

(72) Inventors: Joe Shahram Ghalam, Greenbrae, CA (US); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/176,991

(22) Filed: Mar. 1, 2023

(51) Int. Cl.
| | |
|---|---|
| H04L 67/147 | (2022.01) |
| H04L 41/0806 | (2022.01) |
| H04L 41/0826 | (2022.01) |
| H04L 41/0894 | (2022.01) |
| H04L 47/20 | (2022.01) |

(52) U.S. Cl.
CPC ........ *H04L 67/147* (2013.01); *H04L 41/0806* (2013.01); *H04L 41/0826* (2013.01); *H04L 41/0894* (2022.05); *H04L 47/20* (2013.01)

(58) Field of Classification Search
CPC ............... H04L 67/147; H04L 41/0806; H04L 41/0826; H04L 41/0894; H04L 47/20
See application file for complete search history.

(56) References Cited

U.S. PATENT DOCUMENTS

2018/0317134 A1* 11/2018 Leroux ............... H04L 41/0806

FOREIGN PATENT DOCUMENTS

| | | | |
|---|---|---|---|
| CN | 111010305 | * | 4/2020 |
| CN | 111010305 A | * | 4/2020 |
| CN | 115 037 623 A | | 9/2022 |
| EP | 1 976 233 A1 | | 10/2008 |
| JP | 5678690 | * | 3/2015 |
| JP | 5678690 B2 | * | 3/2015 |
| WO | WO-2018152386 A1 | * | 3/2018 ......... G06F 9/45558 |

OTHER PUBLICATIONS

Invitation to Pay Additional Fees mailed Feb. 20, 2024 for PCT Application No. PCT/US2023/035968, 43 pages.

(Continued)

*Primary Examiner* — Hua Fan
(74) *Attorney, Agent, or Firm* — Amin, Turocy & Watson, LLP

(57) ABSTRACT

Techniques are disclosed for mediating concurrent control of a radio access network (RAN) network function by multiple different SMOs. A controller at the RAN network function can be adapted to initiate concurrent sessions between the network function and multiple different service management and orchestration entities (SMOs). The controller can mediate application of different SMO policies by initiating sessions with SMOs that have policy alignment, and/or by prioritizing among different SMO policies and applying higher priority SMO policies in the event of SMO policy conflicts. A variety of techniques are disclosed for initiating, managing, and if necessary terminating concurrent sessions between the network function and multiple different SMOs.

20 Claims, 13 Drawing Sheets

(56) References Cited

OTHER PUBLICATIONS

Jeong J et al: "I2NSF NSF Monitoring Interface YANG Data Model draft-ietf-i2nsf-nsf-monitoring-data-model-20" Jun. 1, 2022, [https://tools.ietf.org/html./draft-ietf-i2nsf-nsf-monitoring-data-model-20] 99 pages.
"Telecommunications and Internet converged Services and Protocols for Advanced Networking (TISPAN); IPTV Architecture; IPTV functions supported by the IMS subsystem", ETSI TS_182_027_Output_Draft, v3.4.1, Jun. 2010, 196 pages.
International Search Report and Written Opinion mailed May 3, 2024 for PCT Application No. PCT/US2023/035968, 31 pages.
Chaoming Luo (OPPO): "Discussion on Session Termination", vol. 802.11bf, IEEE-SA Mentor, Piscataway, NJ USA, Nov. 29, 2021, [https://mentor.IEEE.org/802.11/dcn/21/11-21-1936-00-00bf-discussion-on-session-termination.pptx], 9 pages.

\* cited by examiner

DISTRIBUTED AND FEDERATED RADIO ACCESS NETWORK CONFIGURATION MANAGEMENT

BACKGROUND

Today's cellular communication networks generally include a core network that is administered by a network operator, and a radio access network (RAN) which is administered by one or more RAN vendors. The RAN typically includes the antennas and other equipment in the field which communicate with user devices (UEs), and the RAN relays communications to and from the core network.

Many parameters of the RAN equipment can be controlled from the core network, thereby allowing network operators to direct RAN network traffic according to their own core network settings and priorities. The core networks include proprietary service management and orchestration (SMO) layers/equipment which include network configuration protocol (NetConf) servers that handle configuration and control of RAN network equipment. Meanwhile, the RAN network equipment includes NetConf clients that communicate with the NetConf servers and configure the RAN network equipment as directed by the NetConf servers.

The arrangement in which a SMO at a core network controls RAN network parameters can be complicated when additional/multiple SMOs attempt to control RAN network equipment. For example, today's RAN vendors can have their own proprietary SMOs which include NetConf servers that maintain direct NetConf connections to NetConf clients at the RAN network equipment. Furthermore, one or more third party SMOs may get involved, for example when a RAN vendor or network operator outsources aspects of network optimization or use-case specific network configuration to a third party. Configuring RAN network equipment parameters from different SMOs is challenging and can result in conflicts and discrepancies that deteriorate the overall network performance.

Today's fourth generation (4G) and fifth generation (5G) networks use a single NetConf client per RAN network function (NF). As a result, it is only possible to have a single SMO that directly configures a NF. This single SMO is, for example, the RAN vendor SMO. A northbound interface (NBIF) extension can be used to allow the RAN vendor SMO to communicate with an upstream SMO, such as a network operator SMO, and the network operator SMO can in turn communicate via NBIF extension with a third party SMO, so that SMOs are connected in a cascaded format. However, exposing NF configurations to multiple SMOs in such a cascaded format can make a network prone to errors. The use of a NBIF extension prolongs the time-to-market and production cost of a RAN network, as the RAN vendor needs to develop southbound interfaces to mirror its NetConf capabilities. In addition, NBIF extensions can create interoperability issues in multi-vendor deployments since NBIF extensions are typically not standardized.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
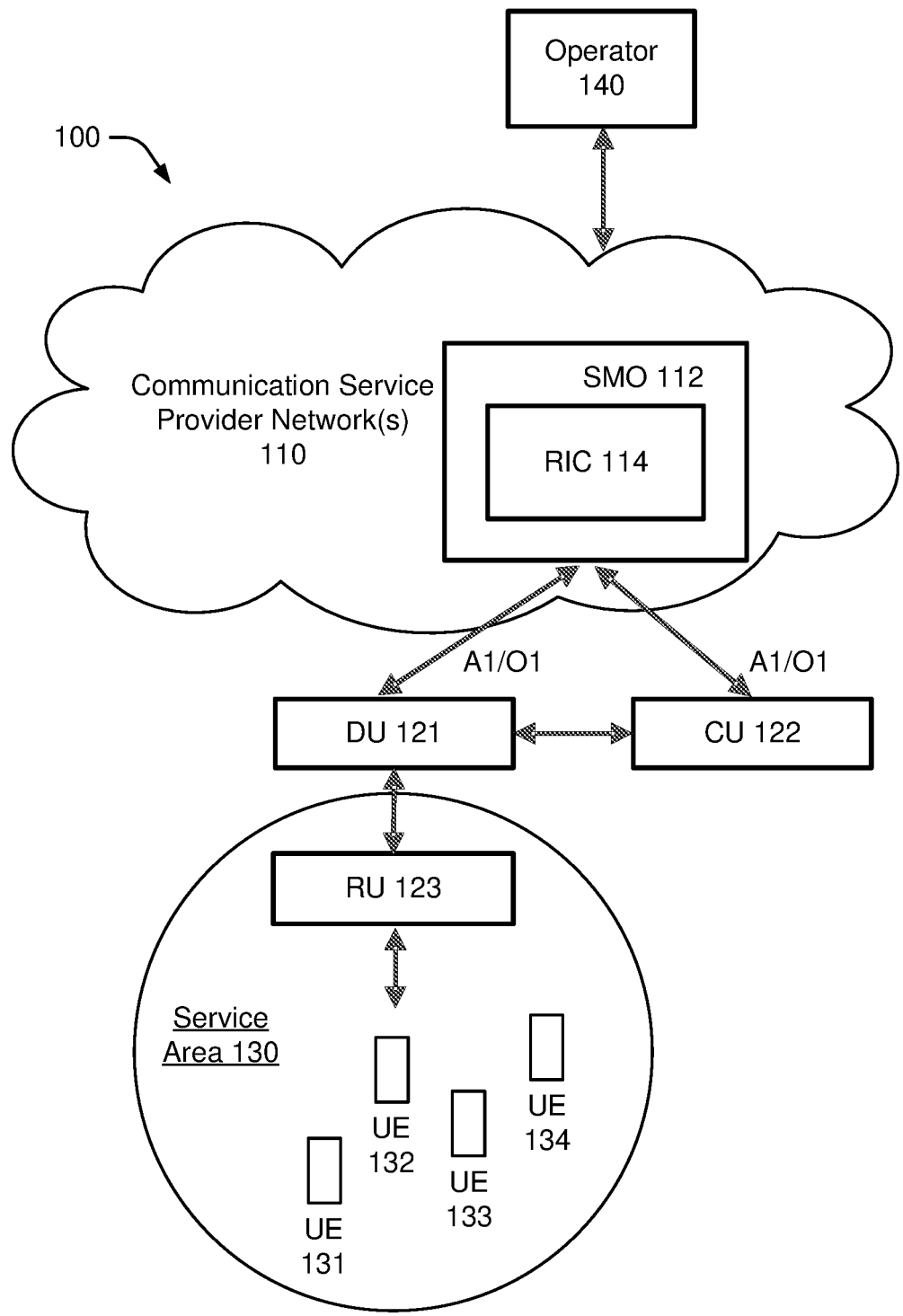
FIG. 1 illustrates an example cellular communication network, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to distributed and federated RAN configuration management. Techniques are disclosed for mediating simultaneous control of a RAN network function by multiple different SMOs. A controller at the RAN network function can be adapted to initiate concurrent sessions between the network function and multiple different SMOs. The controller can mediate application of different SMO policies by initiating sessions with SMOs that have policy alignment, and/or by prioritizing among different SMO policies and applying higher priority SMO policies in the event of SMO policy conflicts. A variety of techniques are disclosed for initiating, managing, and if necessary terminating concurrent sessions between the network function and multiple different SMOs. Further aspects and embodiments of this disclosure are described in detail below.

FIG. 1 illustrates an example cellular communication network, in accordance with one or more embodiments described herein. FIG. 1 includes a wireless communication system 100 comprising communication service provider network(s) 110, disaggregated RAN network functions including a distributed unit (DU) 121, a centralized unit (CU) 122, and a radio unit (RU) 123 that provides cellular service in a service area 130, user equipment (UEs) 131, 132, 133, 134, and an operator 140. The communication service provider network(s) 110 can include a service management and orchestration entity (SMO) 112 which can comprise, e.g., a RAN intelligent controller (RIC) 114. The SMO 112 and the RIC 114 can configure the disaggregated RAN network functions 121, 122, 123 according to the operator 140 and communication service provider network(s) 110 settings and parameters.

In FIG. 1, an A1/O1 type interface can implement a backhaul link which connects the communication service provider network(s) 110 and the disaggregated RAN network functions 121, 122, 123. The disaggregated RAN network functions 121, 122, 123 can implement a network node or cell which communicates with UEs 131, 132, 133, 134 within the service area 130. The communications with the UEs 131, 132, 133, 134 can comprise downlink (DL) communications and uplink (UL) communications.

In general, with reference to FIG. 1, the non-limiting term "user equipment" can refer to any type of device that can communicate with RU 123 in a cellular or wireless communication system 100. UEs 131, 132, 133, 134 can have one or more antenna panels having vertical and horizontal elements. Examples of UEs 131, 132, 133, 134 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 131, 132, 133, 134 can also comprise IOT devices that communicate wirelessly.

In various embodiments, system 100 comprises communication service provider network(s) 110 serviced by one or more wireless communication network providers, such as operator 140. Communication service provider network(s) 110 can comprise a "core network". In example embodiments, UEs 131, 132, 133, 134 can be communicatively coupled to the communication service provider network(s) 110 via the disaggregated RAN network functions 121, 122, 123. The communication service provider network(s) 110 can provide settings, parameters, and other control information to the disaggregated RAN network functions 121, 122, 123, which can configure communications with the UEs 131, 132, 133, 134.

The disaggregated RAN network functions 121, 122, 123 can communicate with UEs 131, 132, 133, 134, thus providing connectivity between the UEs 131, 132, 133, 134 and the wider cellular network. The UEs 131, 132, 133, 134 can send transmission type recommendation data to the disaggregated RAN network functions 121, 122, 123. The transmission type recommendation data can comprise a recommendation to transmit data via a closed loop multiple input multiple output (MIMO) mode and/or a rank-1 precoder mode.

The RU 123, and optionally the other network functions 121 and 122, can be positioned inside a cabinet or other protected enclosure, and can be implemented via computing devices, an antenna mast, and multiple antennas for performing various transmission operations (e.g., MIMO operations) and for directing/steering signal beams. The disaggregated RAN network functions 121, 122, 123 can comprise one or more base station devices which implement features of a network node. Network nodes can serve several cells, depending on the configuration and type of antenna. In example embodiments, UEs 131, 132, 133, 134 can send and/or receive communication data via wireless links to the disaggregated RAN network functions 121, 122, 123.

Communication service provider networks 110 can facilitate providing wireless communication services to UEs 131, 132, 133, 134 via the disaggregated RAN network functions 121, 122, 123 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The disaggregated RAN network functions 121, 122, 123 can be connected to the one or more communication service provider networks 110 via one or more backhaul links. The one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also comprise wireless link components, such as but not limited to, line-of-sight (LOS) or non-LOS links which can comprise terrestrial air-interfaces or deep space links (e.g., satellite communication links for navigation). Backhaul links can be implemented via a "transport network" in some embodiments. In another embodiment, disaggregated RAN network functions 121, 122, 123 can be part of an integrated access and backhaul network. This may allow easier deployment of a dense network of self-backhauled 5G cells in a more integrated manner by building upon many of the control and data channels/procedures defined for providing access to UEs 132, 133.

Wireless communication system 100 can employ various cellular systems, technologies, and modulation modes to facilitate wireless radio communications between devices (e.g., the UEs 131, 132, 133, 134 and the disaggregated RAN network functions 121, 122, 123). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133 and the network node 131) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
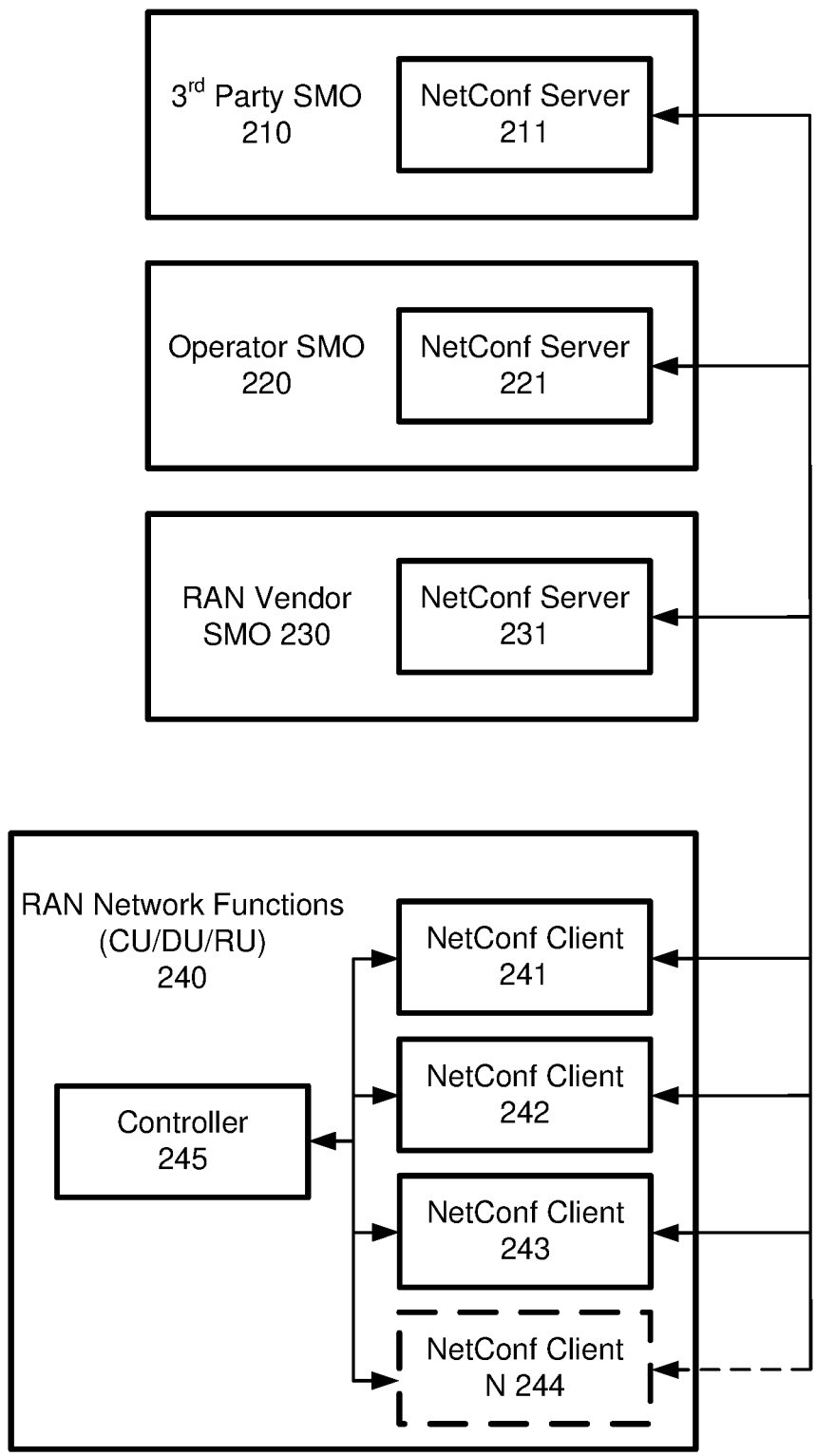
FIG. 2 illustrates a first example system architecture in which RAN network functions are equipped with a controller and multiple network configuration protocol (NetConf) clients, in order to mediate multiple concurrent sessions with different service management and orchestration (SMO) entities, in accordance with one or more embodiments described herein.

FIG. 2 illustrates a first example system architecture in which RAN network functions are equipped with a controller and multiple network configuration protocol (NetConf) clients, in order to mediate multiple concurrent sessions with different service management and orchestration (SMO) entities, in accordance with one or more embodiments described herein. FIG. 2 includes three example SMOs, including a RAN vendor SMO 230, an operator SMO 220, and a third-party SMO 210. Each of the SMOs includes a NetConf server: RAN vendor SMO 230 includes NetConf server 231, operator SMO 220 includes NetConf server 221, and third-party SMO 210 includes NetConf server 211.

FIG. 2 further includes a group of RAN network functions (CU/DU/RU) 240. The RAN network functions 240 include a controller 245 and multiple NetConf clients 241, 242, 243, . . . 244. FIG. 2 illustrates that the multiple NetConf servers 211, 221, 231 are concurrently connected in NetConf sessions with the multiple NetConf clients 241, 242, 243 . . . 244. For example, the NetConf server 211 can be in a NetConf session with NetConf client 241, the NetConf server 221 can be in a NetConf session with NetConf client 242, the NetConf server 231 can be in a NetConf session with NetConf client 243, and NetConf client N 244 remains available for a NetConf session for any additional NetConf servers. The NetConf servers 211, 221, 231 can simultaneously attempt to configure the RAN network functions 240 via the illustrated NetConf sessions, and the controller 245 can be adapted to mediate the configuration parameters and policies applied by the NetConf servers 211, 221, 231.

A system architecture such as illustrated in FIG. 2 enables distributed and federated multi-vendor configuration management in which the RAN network functions (CU/DU/RU) 240 can be connected directly to multiple SMOs 210, 220, 230 simultaneously, thereby eliminating SMO dependencies on the northbound interfaces of lower-level SMOs. The controller 245 can be configured to employ a series of operator-based moderation rules to avoid configuration ownership conflicts, minimize the risk of misconfiguring common parameters, and resolve inter-NF configuration dependencies.

An example group of operations and techniques implemented by the controller 245 can pertain to RAN network function NetConf client capability reporting. The RAN network functions (CU/DU/RU) 240 can be configured to report their network function configuration client capabilities to the controller 245. Example reported information can include a maximum number of simultaneous NetConf connections and configuration parameters that can be configured remotely (read, write, . . . etc.) for each type of SMO.

Another example group of operations and techniques implemented by the controller 245 can pertain to operator-based moderation policies. For example, a priority for each NetConf session can be configured by the operator to control network function behavior when the number of requested NetConf sessions is beyond a maximum capability of the network functions 240. Example behaviors can include retaining NetConf sessions on a first-come-first-served basis, or on a SMO priority basis. Network function 240 priorities can be set per configuration parameter, per-cell or in a time-based approach, e.g., allowing different SMOs to change cell coverage parameters during different times, such as allowing the operator SMO 220 to change cell coverage parameters during peak hours.

Another example group of operations and techniques implemented by the controller 245 can pertain to autonomous moderation. The capabilities of simultaneous NetConf sessions that can be handled by the RAN network functions 240 can be updated during runtime as the RAN network functions 240 processing load varies due to time-varying user traffic. In the case of high load on the RAN network functions 240, one or more of the established NetConf sessions can be terminated according to the operator-based rules. In addition, during runtime, the controller 245 can be configured to learn the reconfiguration periodicity from different NetConf servers 211, 221, 231, and reconcile configuration changes to reduce the signaling overhead from propagating the configuration updates across different network entities.

Another example group of operations and techniques implemented by the controller 245 can pertain to synchronized configuration. The controller 245 can be configured to propagate RAN network functions 240 configuration state across the multiple NetConf sessions, as well as to other neighboring RAN network functions to ensure a synchronized common configuration. A configuration can be updated to "completed" or "failed," and a "failed" configuration can trigger rollback for at least parameters that need unified values across the different RAN network functions 240. In some embodiments, the controller 245 can be configured to lock one or more configuration state parameters to avoid reconfiguration for a time window, for one or more of the multiple NetConf sessions. In some embodiments, locking a parameter can be applied in response to multiple failures and/or rollbacks.

Another example group of operations and techniques implemented by the controller 245 can pertain to dependency awareness. Some configuration parameters of the RAN network functions 240 have dependency on other configuration parameters, and in some cases, the other configuration parameters may be controlled by a different SMO. For instance, SMO 230 may delete a new radio (NR) cell instance, which can necessitate updating handover relations of other cells where the handover relations are controlled by a different SMO 220. To address this type of scenario, the controller 245 can first align between the owners (SMO 230 and SMO 220) of such dependent parameters before completing reconfiguration of the RAN network functions 240.

Figure 3:
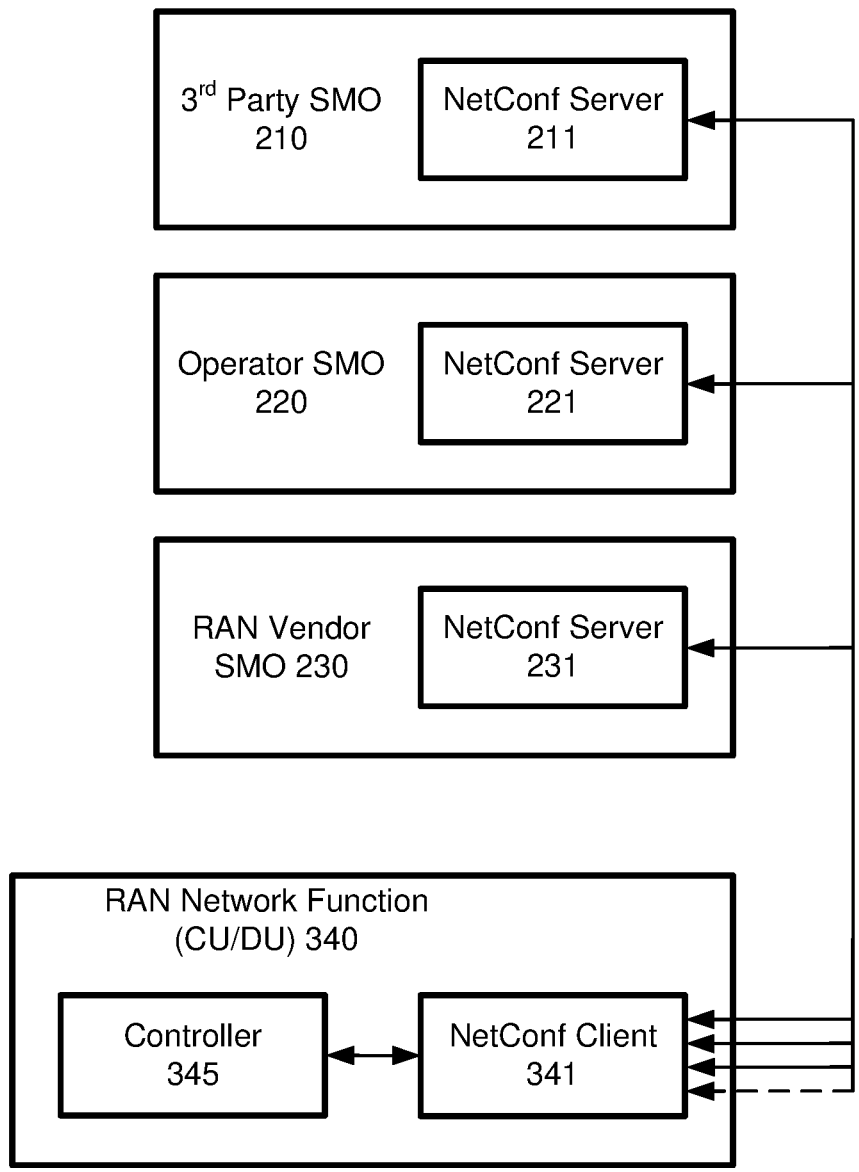
FIG. 3 illustrates a second example system architecture in which a RAN network function is equipped with a controller and a single NetConf client, and the controller and the single NetConf client are adapted to mediate multiple concurrent sessions with different SMOs, in accordance with one or more embodiments described herein.

FIG. 3 illustrates a second example system architecture in which a RAN network function is equipped with a controller and a single NetConf client, and the controller and the single NetConf client are adapted to mediate multiple concurrent sessions with different SMOs, in accordance with one or more embodiments described herein. FIG. 3 includes the three example SMOs introduced in FIG. 2, including the RAN vendor SMO 230, the operator SMO 220, and the third-party SMO 210. As in FIG. 2, each of the SMOs includes a NetConf server: RAN vendor SMO 230 includes NetConf server 231, operator SMO 220 includes NetConf server 221, and third-party SMO 210 includes NetConf server 211.

FIG. 3 further includes an example RAN network function (CU/DU) 340. The RAN network function 340 can include a controller 345 and a single NetConf client 341. FIG. 3 illustrates that the multiple NetConf servers 211, 221, 231 are concurrently connected in NetConf sessions with the single NetConf client 341. The NetConf servers 211, 221, 231 can simultaneously attempt to configure the RAN network function 340 via the illustrated NetConf sessions, and the controller 345 can be adapted to mediate the configuration parameters and policies applied by the NetConf servers 211, 221, 231.

In some embodiments, the various operations and techniques implemented by the controller 245 illustrated in FIG. 2 can be applied in the context of the second example system architecture illustrated in FIG. 3. In FIG. 3, the RAN network function 340 comprises a single NetConf client 341 that handles multiple NetConf sessions with different SMOs 210, 220, 230.

Figure 4:
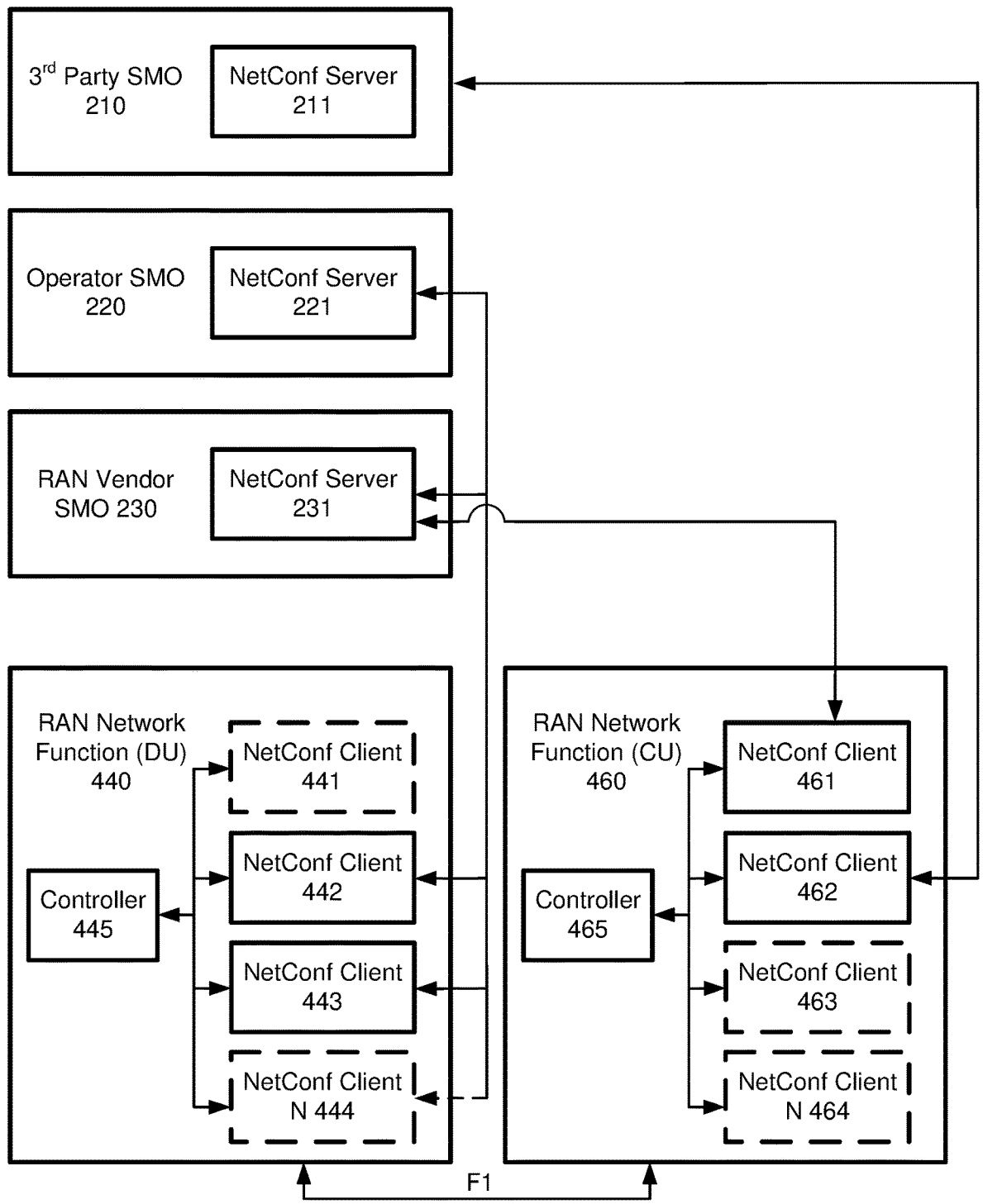
FIG. 4 illustrates a third example system architecture in which RAN network functions of a same cell are equipped with controllers and NetConf clients, and the controllers and the NetConf clients are adapted to cooperate to mediate multiple concurrent sessions with different SMOs, in accordance with one or more embodiments described herein.

FIG. 4 illustrates a third example system architecture in which RAN network functions of a same cell are equipped with controllers and NetConf clients, and the controllers and the NetConf clients are adapted to cooperate to mediate multiple concurrent sessions with different SMOs, in accordance with one or more embodiments described herein. FIG. 4 includes the three example SMOs introduced in FIG. 2, including the RAN vendor SMO 230, the operator SMO 220, and the third-party SMO 210. Each of the SMOs includes a NetConf server: RAN vendor SMO 230 includes NetConf server 231, operator SMO 220 includes NetConf server 221, and third-party SMO 210 includes NetConf server 211.

FIG. 4 further includes a first example RAN network function (DU) 440 and a second example RAN network function (CU) 460. The first example RAN network function 440 includes a controller 445 and multiple NetConf clients 441, 442, 443, . . . 444. FIG. 4 illustrates that several of the multiple NetConf servers 221, 231 are concurrently connected in NetConf sessions with several of the NetConf clients 442, 443. For example, the NetConf server 221 can be in a NetConf session with NetConf client 442, and the NetConf server 231 can be in a NetConf session with NetConf client 443. NetConf client 441 and NetConf client N 444 remain available for NetConf sessions with any additional NetConf servers. The NetConf servers 221, 231 can simultaneously attempt to configure the RAN network function 440 via the illustrated NetConf sessions, and the controller 445 can be adapted to mediate the configuration parameters and policies applied by the NetConf servers 221, 231, while also propagating/mediating the received configuration parameters and policies via a connection, such as the illustrated F1 connection, with the RAN network function 460.

The second example RAN network function 460 includes a controller 465 and multiple NetConf clients 461, 462, 463, . . . 464. FIG. 4 further illustrates that several of the multiple NetConf servers 211, 231 are concurrently connected in NetConf sessions with several of the NetConf clients 461, 462 of the RAN network function 460. For example, the NetConf server 211 can be in a NetConf session with NetConf client 462, and the NetConf server 231 can be in a NetConf session with NetConf client 461. NetConf client 463 and NetConf client N 464 remain available for NetConf sessions with any additional NetConf servers. The NetConf servers 211, 231 can simultaneously attempt to configure the RAN network function 460 via the illustrated NetConf sessions, and the controller 465 can be adapted to mediate the configuration parameters and policies applied by the NetConf servers 211, 231, while also propagating/mediating the received configuration parameters and policies via a connection, such as the illustrated F1 connection, with the RAN network function 440.

In some embodiments, the various operations and techniques implemented by the controller 245 illustrated in FIG. 2 can be applied in the context of the third example system architecture illustrated in FIG. 4. In FIG. 4, disaggregated RAN network functions 440, 460 of a same cell can have different SMO connectivity. The controllers 445, 465 can be configured to broadcast/synchronize configuration parameters between the RAN network functions 440, 460 and the SMOs 210, 220, 230.

Figure 5:
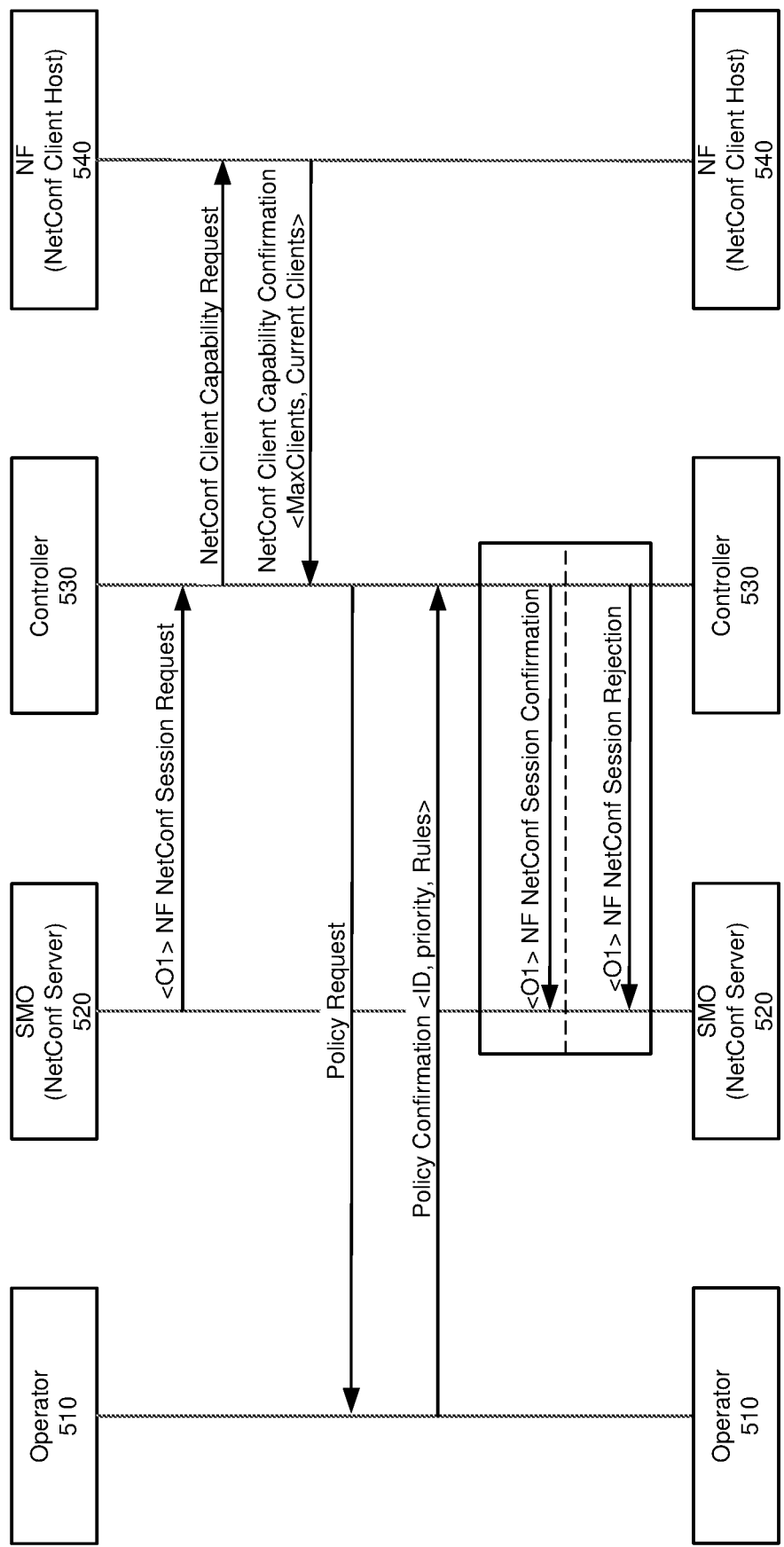
FIG. 5 is a signaling diagram that illustrates example interactions between an operator, a SMO, a controller, and a network function, in order to establish a NetConf session for the network function, in accordance with one or more embodiments described herein.

FIG. 5 is a signaling diagram that illustrates example interactions between an operator 510, a SMO 520, a controller 530, and a network function (NF) 540, in order to establish a NetConf session for the network function 540, in accordance with one or more embodiments described herein. The SMO 520 can implement, e.g., any of the SMOs 210, 220, 230 described in connection with FIGS. 2-4, and the operator 510 can comprise an operator/owner of the SMO 520. The controller 530 can implement any of the controllers 245, 345, 445 described in connection with FIGS. 2-4. The network function 540 can implement any of the network functions 240, 340, 440, 460 described in connection with FIGS. 2-4.

In general, FIG. 5 illustrates a SMO NetConf server initiating a new NetConf session with the network function 540. The controller 530 can be configured to trigger a series of moderation and alignment operations to handle parallel NetConf sessions of the network function 540. The moderation and alignment operations can comprise, e.g., fetching capabilities from the network function 540 and reading policies from the operator 510.

The SMO 520 can send a NF NetConf session request to the controller 530, via an O1 interface. The controller 530 can receive the NF NetConf session request and can send a NetConf client capability request to the network function 540. The network function 540 can receive the NetConf client capability request and can return a NetConf client capability confirmation which can include information such as max clients (a threshold number of NetConf sessions supported by the NF 540), and current clients (a current number of NetConf sessions active at the NF 540).

The controller 530 can receive the NetConf client capability confirmation and can send a policy request to the operator 510. The operator 510 can receive the policy request, and can return a policy confirmation which can include information such as policy identifier (ID), priority of the SMO 520 (which can include priority levels for different parameters or time windows), and rules (i.e. rules governing parameter settings at the network function 540).

The controller 530 can receive the policy confirmation. The controller 530 can analyze the NetConf client capability confirmation and the policy confirmation, for example by determining whether the new session with SMO 520 will exceed the network function's 540 max clients or whether the SMO policy will align or conflict with other policies of other SMOs connected to the network function 540. In response to approving the new session with SMO 520, the controller 530 can send an O1 interface NF NetConf session confirmation to the SMO 520. In response to rejecting the new session with SMO 520, the controller 530 can send an O1 interface NF NetConf session rejection to the SMO 520.

Figure 6:
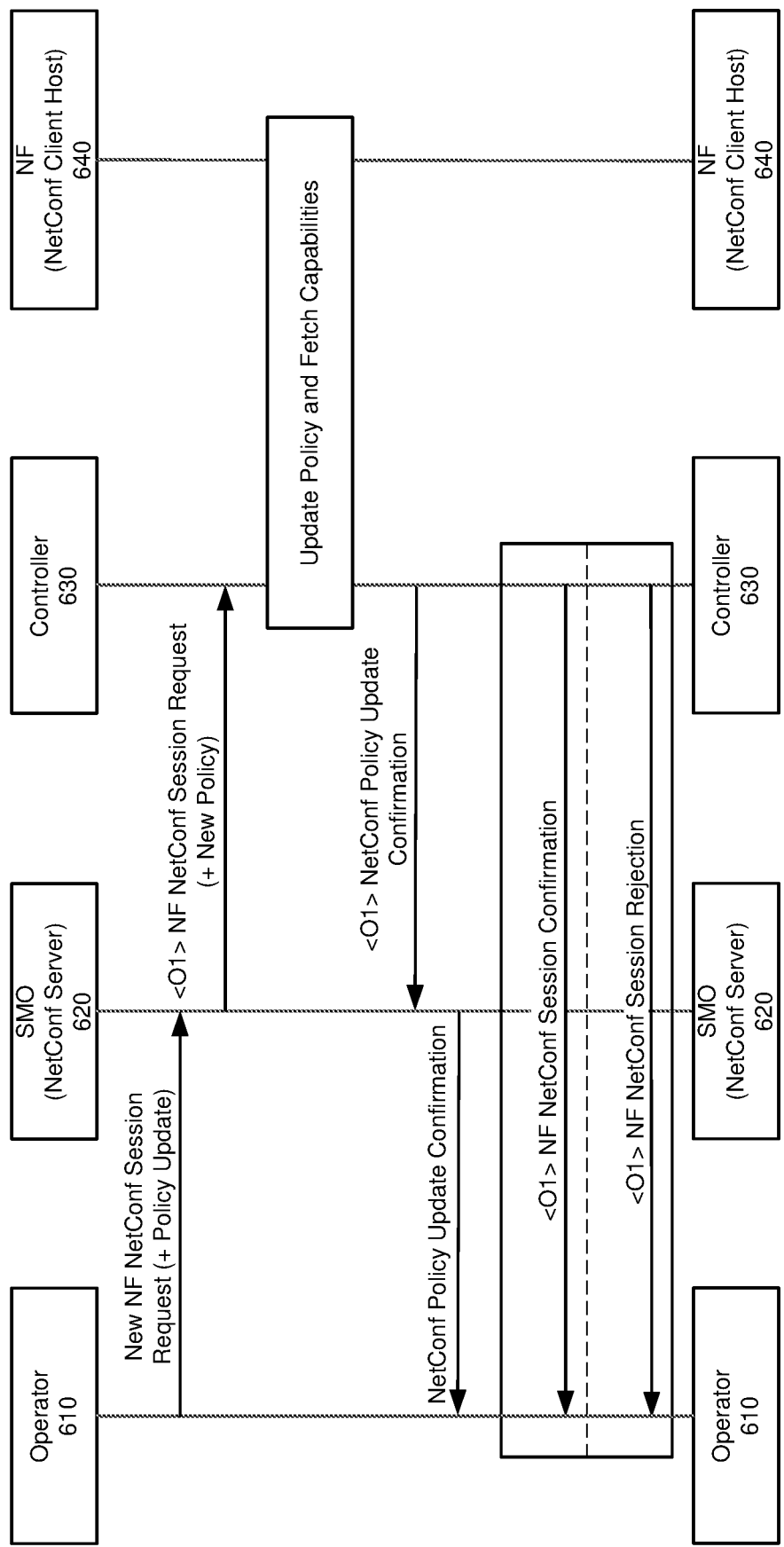
FIG. 6 is another signaling diagram that illustrates example alternative interactions between an operator, a SMO, a controller, and a network function, in order to establish a NetConf session for the network function, in accordance with one or more embodiments described herein.

FIG. 6 is another signaling diagram that illustrates example alternative interactions between an operator 610, a SMO 620, a controller 630, and a network function (NF) 640, in order to establish a NetConf session for the network function, in accordance with one or more embodiments described herein. The SMO 620 can implement, e.g., any of the SMOs 210, 220, 230, 520 described in connection with FIGS. 2-5, and the operator 610 can comprise an operator/owner of the SMO 620. The controller 630 and can implement any of the controllers 245, 345, 445, 530 described in connection with FIGS. 2-5. The network function 640 can implement any of the network functions 240, 340, 440, 460, 540 described in connection with FIGS. 2-5.

In general, FIG. 6 illustrates initiation of a new NetConf session by the operator 610, wherein a request to initiate the new NetConf session is bundled with a policy update. The policy update might result in (a) rejecting the new NetConf session, (b) accepting the new NetConf session, or (c) terminating an ongoing NetConf session before accepting the new NetConf session. The terminated NetConf session can be, e.g. a NetConf session deemed to have lower priority than the new NetConf session, based on NetConf session policies.

The operator 610 can send a new NF NetConf session request bundled with a policy update to the SMO 620. The SMO 620 can receive the new NF NetConf session request and policy update, and the SMO 620 can send, e.g., via an O1 interface, a corresponding NF session request and new policy to the controller 630.

The controller 630 can receive the NF session request and new policy, and the controller 630 can cooperate with the NF 640 to accept or reject the new policy. If the new policy is accepted, the controller 630 can update policies applied at the NF 640 to ensure policy alignment of multiple NetConf sessions, and the controller 630 can fetch capabilities of the NF 640. After updating the NF policies, controller 630 can return, e.g., via the O1 interface, a NetConf policy update confirmation to the SMO 620.

The SMO 620 can receive the NetConf policy update confirmation and can send a NetConf policy update confirmation to the operator 610. After all entities have approved the new policy, a NetConf session between the SMO 620 and the NF 640 can be initiated, and the controller 630 can send an O1 interface NF NetConf session confirmation to the SMO 620 and the operator 610. Conversely, if the new policy is not approved, the controller 630 can send an O1 interface NF NetConf session rejection to the SMO 620 and the operator 610.

Figure 7:
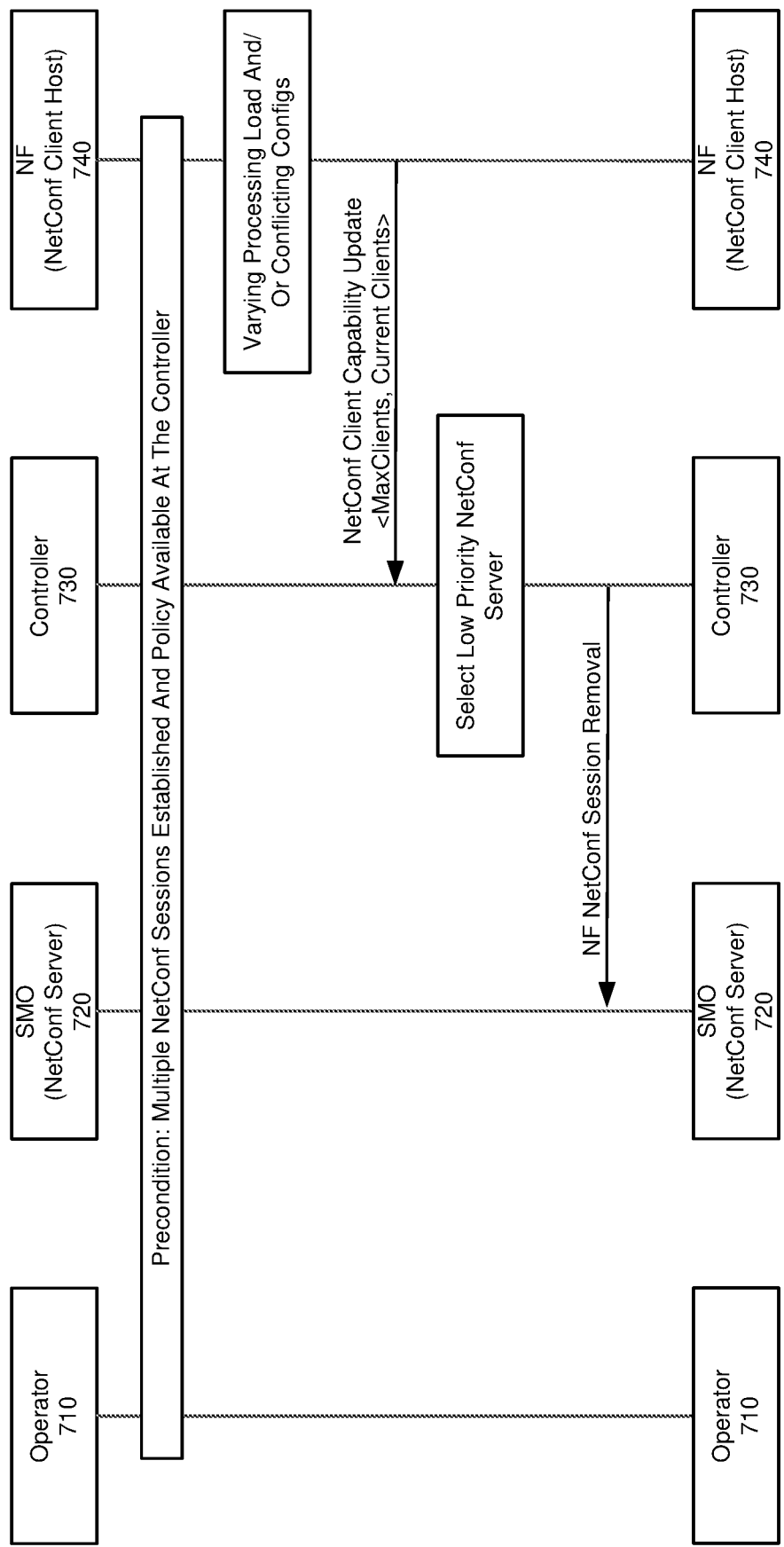
FIG. 7 is another signaling diagram that illustrates example interactions between an operator, a SMO, a controller, and a network function, in order to make a dynamic network function capability change determination and a corresponding NetConf session termination, in accordance with one or more embodiments described herein.

FIG. 7 is another signaling diagram that illustrates example interactions between an operator 710, a SMO 720, a controller 730, and a network function (NF) 740, in order to make a dynamic network function capability change determination and a corresponding NetConf session termination, in accordance with one or more embodiments described herein. The SMO 720 can implement, e.g., any of the SMOs 210, 220, 230, 520, 620 described in connection with FIGS. 2-6, and the operator 710 can comprise an operator/owner of the SMO 720. The controller 730 and can implement any of the controllers 245, 345, 445, 530, 630 described in connection with FIGS. 2-6. The network function 640 can implement any of the network functions 240, 340, 440, 460, 540, 640 described in connection with FIGS. 2-6.

As a precondition for the operations illustrated in FIG. 7, multiple NetConf sessions have been established between the network function 740 and multiple SMOs which can include the SMO 720. Policies of the SMOs are known and available at the controller 730. The network function 740 can experience varying processing load, e.g., due to varying network traffic, or the network function 740 can experience circumstances in which policies and corresponding parameter configurations requested by different SMOs are in a conflict which cannot be resolved by the controller 730. The network function 740 can responsively adjust its capabilities to handle multiple concurrent NetConf sessions, and the network function 740 can send a NetConf client capability update to the controller 730. The NetConf client capability update can include information such as max clients indicating a changed threshold number NetConf sessions supported by the network function 740, and current clients indicating a current number of active NetConf sessions.

In an example, the current clients in the NetConf client capability update can exceed the max clients. The controller 730 can receive the NetConf client capability update and can determine which of the active NetConf sessions to terminate. In some embodiments, the controller 730 can select a NetConf session associated with a low priority NetConf server, e.g. a NetConf server having a lower priority than one or more other NetConf servers. In other embodiments, the controller 730 can select a NetConf session associated with a policy which is in conflict with other policies associated with other NetConf sessions. In an example according to FIG. 7, the SMO 720 is the host of the low priority NetConf server which the controller 730 has determined to terminate. The controller 730 can send a NF NetConf session removal to the SMO 720, and the SMO 720 can receive the NF NetConf session removal, resulting in termination of the NetConf session between the SMO 720 and the network function 740.

Figure 8:
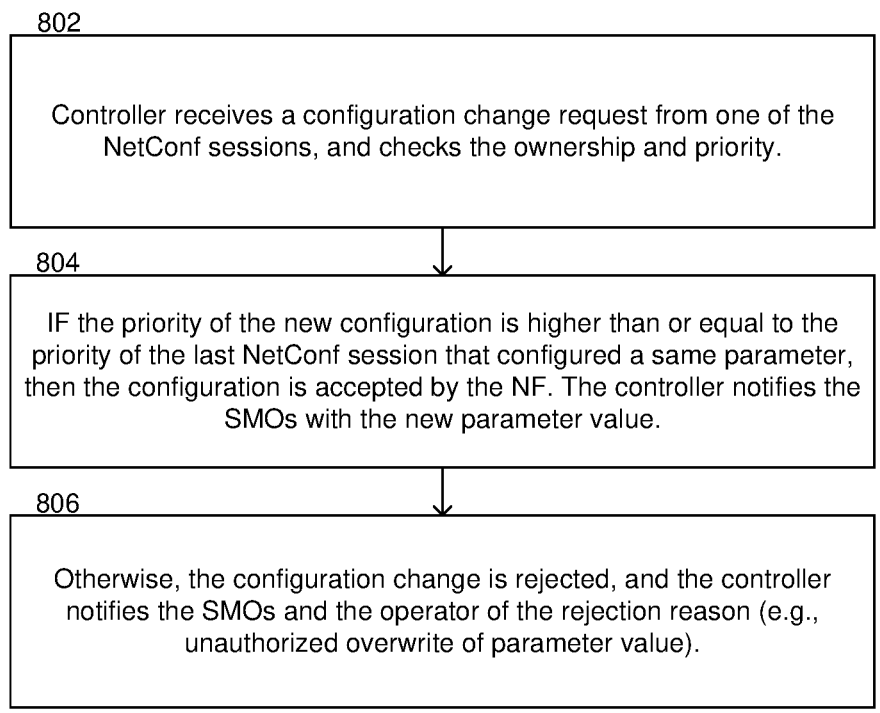
FIG. 8 is a flow diagram of an example, non-limiting computer implemented method for priority-based parameter reconfiguration, in accordance with one or more embodiments described herein.

FIG. 8 is a flow diagram of an example, non-limiting computer implemented method for priority-based parameter reconfiguration, in accordance with one or more embodiments described herein. The operations of FIG. 8 will be described with reference to the architecture illustrated in FIG. 2, however, the architectures illustrated in FIGS. 3 and 4 can also implement the operations illustrated in FIG. 8.

At 802, the controller 245 can receive a configuration change request from one of its NetConf sessions, e.g., a NetConf session with SMO 210. The configuration change request can request change of a parameter used by the RAN network functions 240. The controller 245 can check the ownership and priority of the requesting NetConf session.

At 804, if the if the priority of the new configuration (e.g., a priority of the SMO 210 that submitted the configuration change request) is higher than or equal to the priority of a last NetConf session (e.g., a NetConf session with SMO 220) that configured a same parameter, then the new configuration can be accepted by the RAN network functions 240. The controller 245 can notify the SMOs 210, 220, 230 with the new parameter value.

At 806, otherwise, if the if the priority of the new configuration is not higher, the controller 245 can reject the configuration change, and the controller 245 can notify the SMOs 210, 220, 230 and the operator of SMO 210 of the rejection reason. An example rejection reason is unauthorized overwrite of parameter value.

Figure 9:
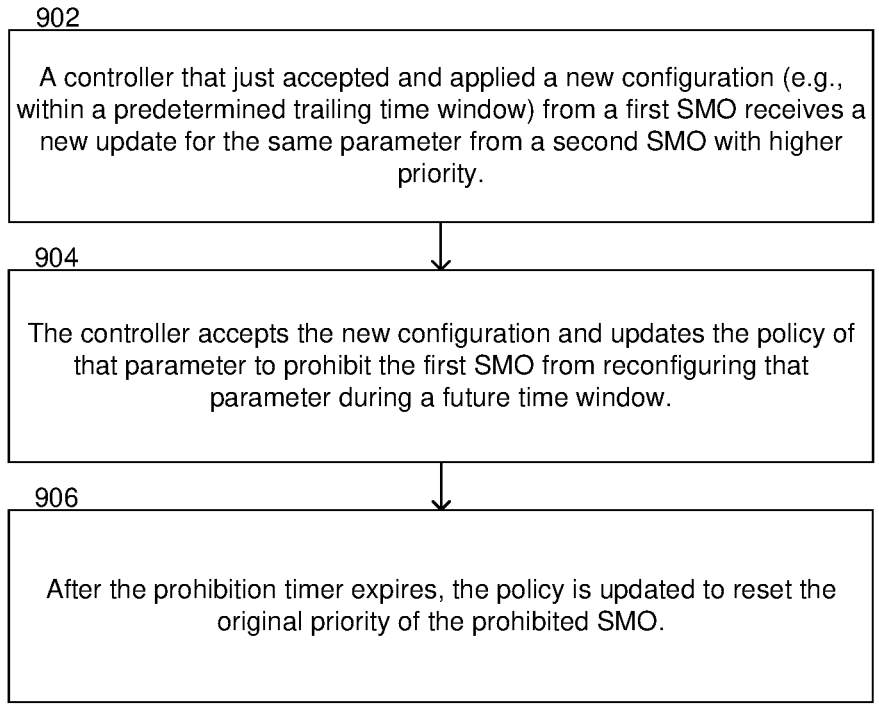
FIG. 9 is a flow diagram of an example, non-limiting computer implemented method to prohibit parameter reconfiguration to avoid a parameter ping-pong effect, in accordance with one or more embodiments described herein.

FIG. 9 is a flow diagram of an example, non-limiting computer implemented method to prohibit parameter reconfiguration to avoid a parameter ping-pong effect, in accordance with one or more embodiments described herein. As with FIG. 8, the operations of FIG. 9 will be described with reference to the architecture illustrated in FIG. 2, however, the architectures illustrated in FIGS. 3 and 4 can also implement the operations illustrated in FIG. 9.

At 902, a controller 245 that just accepted and applied a new configuration (e.g., within a predetermined trailing time window) from a first SMO 230 receives a new update for the same parameter from a second SMO 220 with higher priority. This is a parameter "ping pong" effect in which SMOs 230 and 220 may reset the parameter back and forth in a loop.

At 904, the controller 245 can accept the new configuration and update the policy of that parameter to prohibit the first SMO 230 from reconfiguring that parameter during a future time window of a predetermined duration. At 906, after the prohibition timer expires, the controller 245 can again update the policy of the parameter, to reset an original priority of the prohibited SMO 230.

Figure 10:
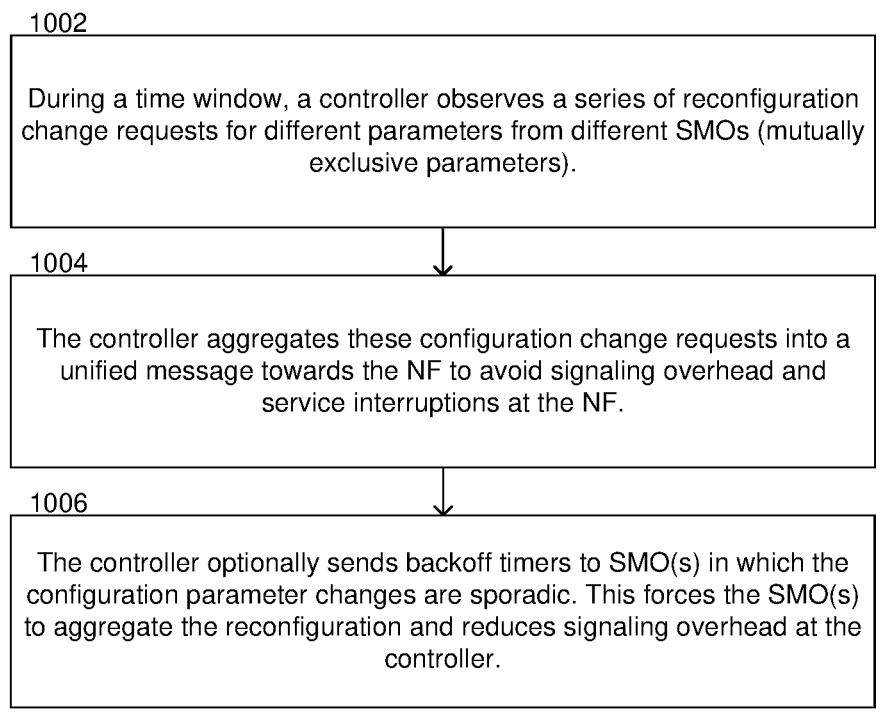
FIG. 10 is a flow diagram of an example, non-limiting computer implemented method to reconcile parameter configurations, in accordance with one or more embodiments described herein.

FIG. 10 is a flow diagram of an example, non-limiting computer implemented method to reconcile parameter configurations, in accordance with one or more embodiments described herein. As with FIGS. 8 and 9, the operations of FIG. 10 will be described with reference to the architecture illustrated in FIG. 2, however, the architectures illustrated in FIGS. 3 and 4 can also implement the operations illustrated in FIG. 10.

At 1002, during a time window of predetermined duration, a controller 245 observes a series of reconfiguration change requests for different parameters from different SMOs 210, 220, 230. The change requests can comprise requests for mutually exclusive parameters such that the RAN network functions 240 cannot simultaneously implement all the received change requests.

At 1004, the controller 1004 can aggregate the received configuration change requests, e.g., by removing or modifying requests for mutually exclusive parameters, in order to produce a unified message towards the RAN network functions 240, to allow the RAN network functions 240 to implement the change requests while avoiding signaling overhead and service interruptions at the RAN network functions 240.

At 1006, the controller 245 can optionally send backoff timers to SMO(s) 210, 220, 230 in which the configuration parameter changes are sporadic. Sporadic backoff timers can be sent for using multiple requests applicable to one or more parameters. The backoff timers force the SMO(s) 210, 220, 230 to aggregate the reconfiguration and reduces signaling overhead at the controller 245.

Figure 11:
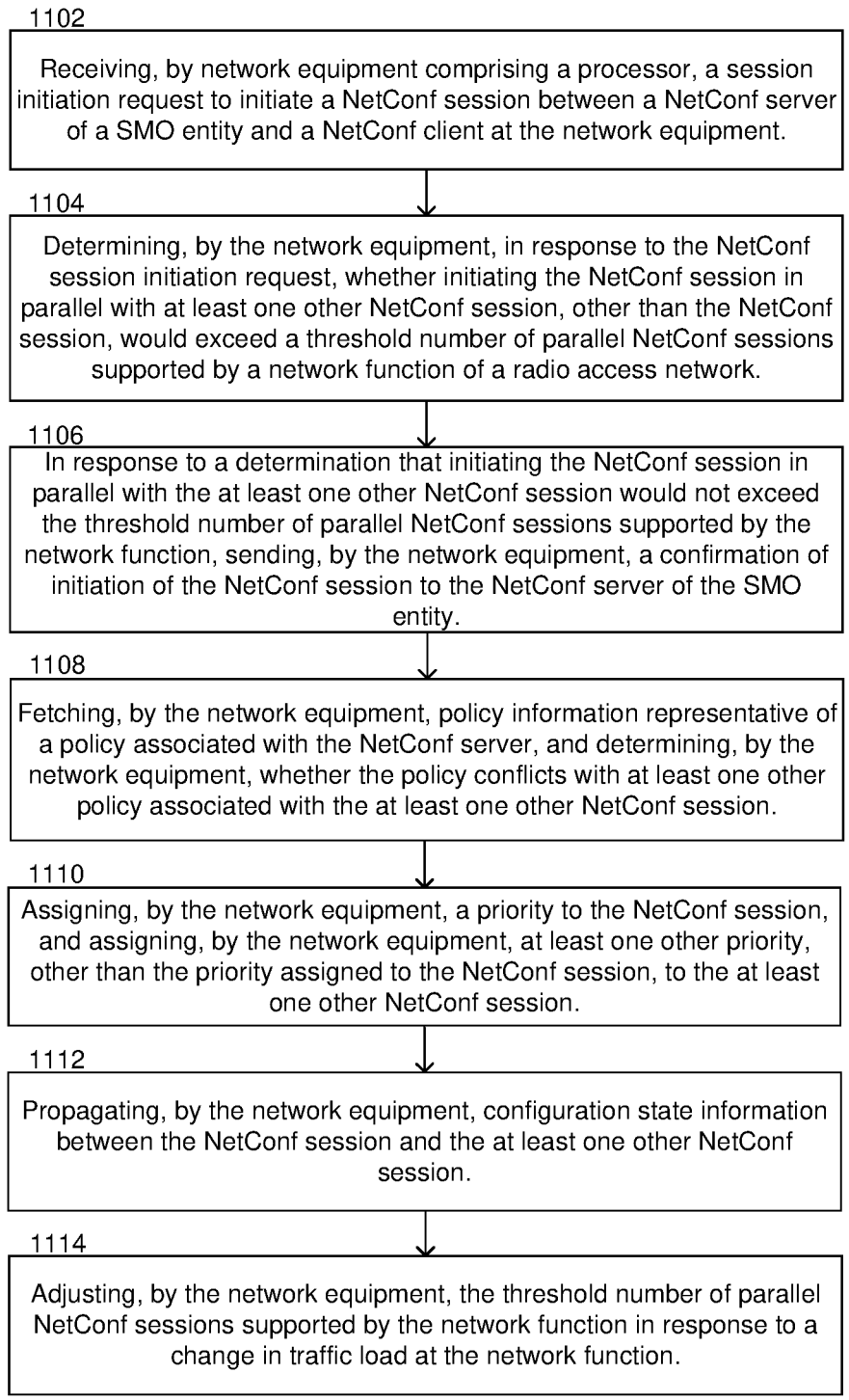
FIG. 11 is a flow diagram of an example, non-limiting computer implemented method to manage initiation of a new NetConf session between a SMO NetConf server and a NetConf client at a network function, wherein the new NetConf session is initiated in parallel with another NetConf session at the network function, in accordance with one or more embodiments described herein.

FIG. 11 is a flow diagram of an example, non-limiting computer implemented method to manage initiation of a new NetConf session between a SMO NetConf server and a NetConf client at a network function, wherein the new NetConf session is initiated in parallel with another NetConf session at the network function, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 11 can be performed by network equipment comprising the RAN network functions (CU/DU/RU) 240, the controller 245, and the network configuration protocol (NetConf) clients 241, 242, 243, 244 illustrated in FIG. 2. Operation 1102 comprises receiving, by network equipment comprising a processor (e.g., receiving at the RAN network functions (CU/DU/RU) 240) a session initiation request to initiate a NetConf session between a NetConf server, e.g., NetConf server 211 of a SMO entity 210, and a NetConf client 241 at the network equipment.

Operation 1104 comprises determining, by the network equipment (e.g. by the controller 245), in response to the NetConf session initiation request, whether initiating the NetConf session in parallel with at least one other NetConf session, other than the NetConf session (e.g., a NetConf session with NetConf server 221), would exceed a threshold number of parallel NetConf sessions supported by a network function of a radio access network, e.g., by the RAN network functions (CU/DU/RU) 240. In an architecture such as FIG. 2, at least one other NetConf client 242, other than the NetConf client 241, is associated with the at least one other NetConf session with NetConf server 221, and the at least one other NetConf client 242 is also implemented at the same network equipment as the RAN network functions (CU/DU/RU) 240.

If it is determined at operation 1104 that that initiating the NetConf session with NetConf server 211 in parallel with the at least one other NetConf session with NetConf server 221 would exceed the threshold number of parallel NetConf sessions supported by the RAN network functions (CU/DU/RU) 240, then the network equipment can be configured to send a rejection of the initiation of the NetConf session to the NetConf server 211 of the SMO 210.

Otherwise, at operation 1106, in response to a determination that initiating the NetConf session with NetConf server 211 in parallel with the at least one other NetConf session with NetConf server 221 would not exceed the threshold number of parallel NetConf sessions supported by the RAN network functions (CU/DU/RU) 240, the network equipment, e.g., the controller 245) can send a confirmation of initiation of the NetConf session to the NetConf server 211 of the SMO 210.

At operation 1108, either before or after operation 1106, the network equipment (e.g., the controller 245) can fetch policy information representative of a policy associated with the NetConf server 211, and the network equipment can determine whether the policy conflicts with at least one other policy associated with the at least one other NetConf session, i.e. the policy of the SMO 220 in this example.

Operation 1110 comprises assigning, by the network equipment (e.g., the controller 245) a priority to the NetConf session with the NetConf server 211, and assigning, by the network equipment, at least one other priority, other than the priority assigned to the NetConf session with the NetConf server 211, to the at least one other NetConf session with the NetConf server 221. The assigned priorities can apply to the NetConf sessions/NetConf servers, or for example to different time periods, e.g., the priority assigned to the NetConf session with the NetConf server 211 can apply to a first time period, while and the at least one other priority assigned to the NetConf server 221 can apply to a second time period that is different from the first time period. In another aspect, the priorities can be applicable to different parameters. For example, the priority of the NetConf server 211 can apply to a first network function parameter, and the at least one other priority assigned to NetConf server 221 can apply to a second network function parameter that is different from the first network function parameter.

Operation 1112 comprises propagating, by the network equipment, e.g., by the controller 245, configuration state information between the NetConf session with NetConf server 211 and the at least one other NetConf session with NetConf server 221. The configuration state information can also be propagated to any further NetConf sessions.

Operation 1114 comprises adjusting, by the network equipment, e.g., by the controller 245, the threshold number of parallel NetConf sessions supported by the RAN network functions (CU/DU/RU) 240 in response to a change in traffic load at the RAN network functions (CU/DU/RU) 240. For example, in response to an increase in traffic load at the RAN network functions (CU/DU/RU) 240, the controller can decrease the threshold number of parallel NetConf sessions, resulting in a termination of some NetConf sessions, and vice versa.

Figure 12:
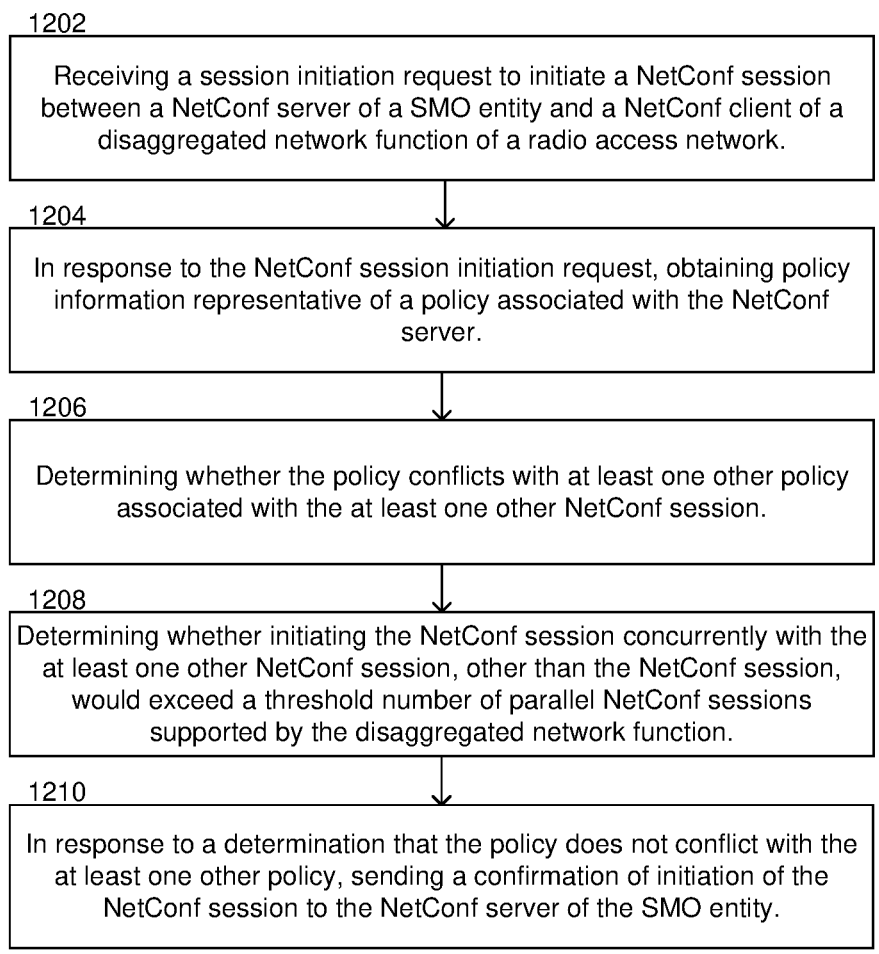
FIG. 12 is a flow diagram of another example, non-limiting computer implemented method to manage initiation of a new NetConf session between a SMO NetConf server and a NetConf client at a network function, wherein the new NetConf session is initiated in parallel with another NetConf session at the network function, in accordance with one or more embodiments described herein.

FIG. 12 is a flow diagram of another example, non-limiting computer implemented method to manage initiation of a new NetConf session between a SMO NetConf server and a NetConf client at a network function, wherein the new NetConf session is initiated in parallel with another NetConf session at the network function, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 12 can be performed by network equipment comprising the RAN network functions (CU/DU/RU) 240, the controller 245, and the network configuration protocol (NetConf) clients 241, 242, 243, 244 illustrated in FIG. 2. Operation 1202 comprises receiving a session initiation request to initiate a NetConf session between a NetConf server, e.g., NetConf server 211 of a SMO 210 and a NetConf client, e.g., NetConf client 241 of a disaggregated network function of a radio access network, e.g., of RAN network functions (CU/DU/RU) 240.

Operation 1204 comprises, in response to the NetConf session initiation request received at operation 1202, obtaining policy information representative of a policy associated with the NetConf server 211. At operation 1206, the controller 245 can determine whether the policy conflicts with at least one other policy associated with the at least one other NetConf session, e.g., a policy of a NetConf session with NetConf server 221.

Operation 1208 comprises determining whether initiating the NetConf session with NetConf server 211 concurrently with the at least one other NetConf session other than the NetConf session (e.g., concurrently with the session with NetConf server 221), would exceed a threshold number of parallel NetConf sessions supported by the disaggregated network function(s) 240. If so, the newly initiated NetConf session with NetConf server 211 can be rejected. If not, the method can proceed to operation 1210.

At operation 1210, in response to a determination that the policy associated with NetConf server 211 does not conflict with the at least one other policy of NetConf server 221, the controller 245 can send a confirmation of initiation of the NetConf session to the NetConf server 211 of the SMO entity 210.

After initiated the new NetConf session with the NetConf server 211, the controller 245 can be configured to mediate multiple NetConf sessions according to the techniques disclosed herein. For example, in some embodiments, the controller 245 can be adapted to identify a remote configurable parameter of the disaggregated network function(s) and a SMO type which indicates a permission to control the remote configurable parameter. The controller 245 can be adapted to allow SMOs of the appropriate SMO type to configure some parameters, while disallowing other SMO types from control over those parameters.

Figure 13:
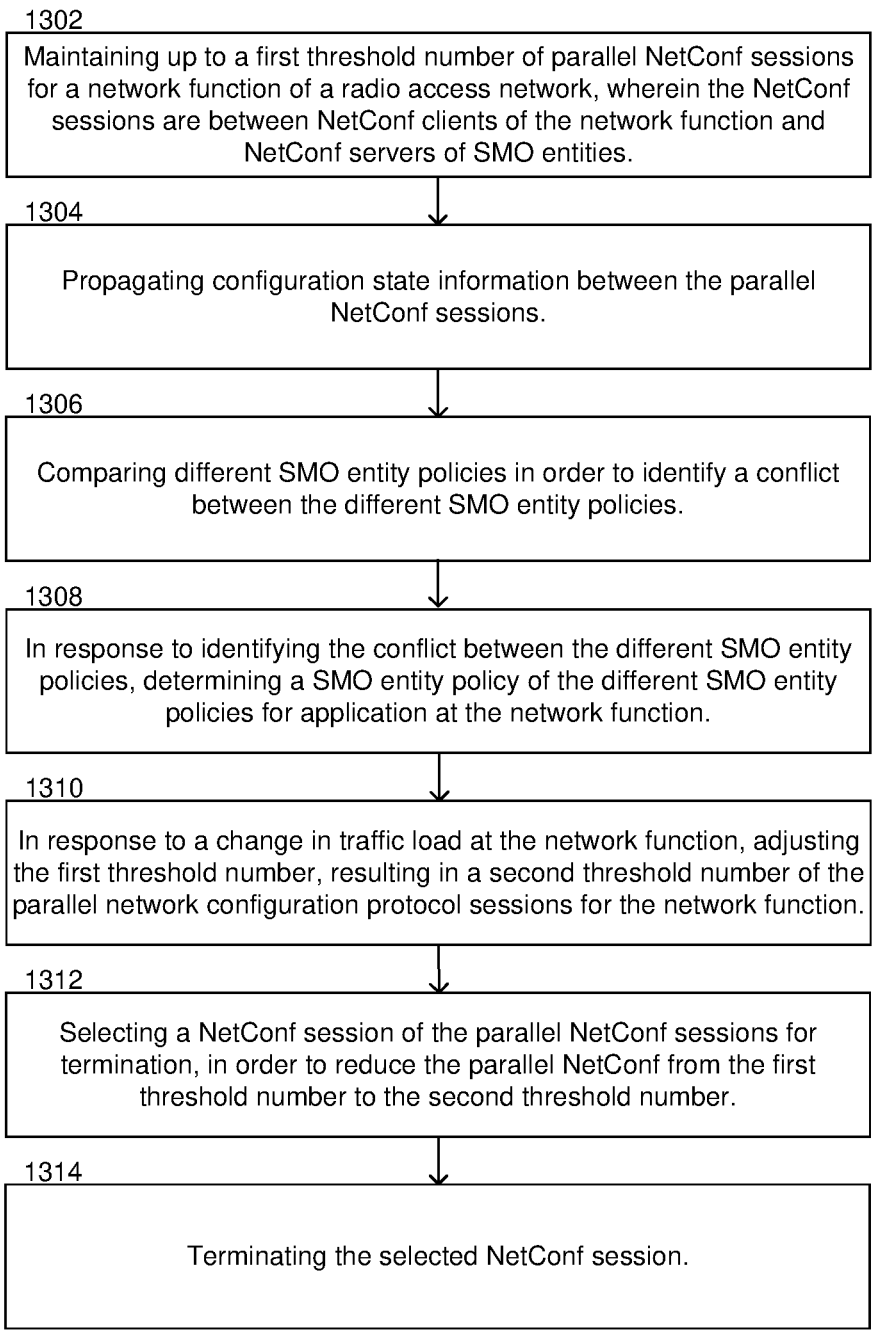
FIG. 13 is a flow diagram of an example, non-limiting computer implemented method to adjust a threshold number of parallel NetConf sessions for a network function, in accordance with one or more embodiments described herein.

FIG. 13 is a flow diagram of an example, non-limiting computer implemented method to adjust a threshold number of parallel NetConf sessions for a network function, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 13 can be performed by network equipment comprising the RAN network functions (CU/DU/RU) 240, the controller 245, and the network configuration protocol (NetConf) clients 241, 242, 243, 244 illustrated in FIG. 2. Operation 1302 comprises maintaining up to a first threshold number of parallel NetConf sessions for a network function (i.e., for RAN network functions (CU/DU/RU) 240) of a radio access network, wherein the NetConf sessions are between NetConf clients 241, 242, 243 of the network function(s) 240 and NetConf servers 211, 221, 231 of SMOs 210, 220, 230. Maintaining the parallel NetConf sessions can comprise, e.g., operations such as 1304.

Operation 1304 comprises propagating configuration state information between the parallel NetConf sessions. For example, the controller 245 can propagate configuration state information between the NetConf sessions with NetConf servers 211, 221, 231.

Each of the parallel NetConf sessions may be associated with different SMO entity 210, 220, 230 policies for the RAN network functions (CU/DU/RU) 240. At operation 1306, the controller 245 can compare the different SMO policies in order to identify a conflict between the different SMO policies. Operation 1308 comprises, in response to identifying the conflict between the different SMO entity policies, determining a SMO entity policy of the different SMO entity policies (e.g., the policy of SMO 230) for application at the RAN network functions (CU/DU/RU) 240.

Operation 1310 comprises, in response to a change in traffic load at the RAN network functions (CU/DU/RU) 240, adjusting the first threshold number, resulting in a second threshold number of the parallel NetConf sessions for the RAN network functions (CU/DU/RU) 240. For example, as traffic load increases, the threshold number of parallel NetConf sessions can be decreased, and vice versa. At operation 1312, the controller 245 can select a NetConf session of the parallel NetConf sessions for termination, in order to reduce the parallel NetConf sessions from the first threshold number to the second threshold number. Operation 1314 comprises terminating the selected NetConf session. Selecting the NetConf session of the parallel NetConf sessions for termination can comprise, e.g., applying a traffic load termination policy such as selecting a lower priority NetConf session or, e.g., a NetConf session with a high-conflict policy that conflicts with multiple other NetConf sessions.

Figure 14:
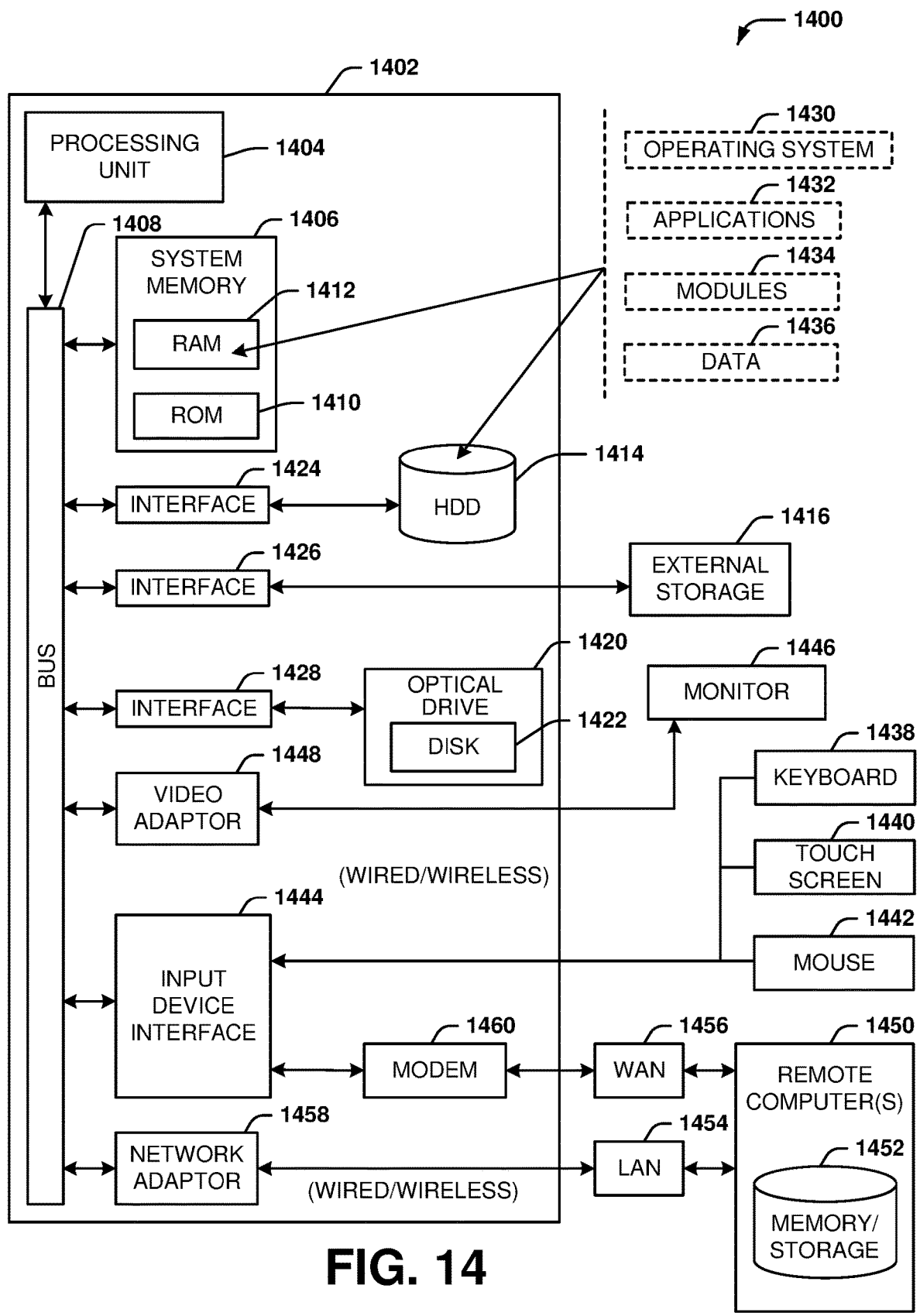
FIG. 14 illustrates a block diagram of an example computer operable to provide any of the various devices described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by network equipment comprising a processor and from a first network configuration protocol server of a first service management and orchestration entity, a session initiation request to initiate a network configuration protocol session between the first network configuration protocol server and a network configuration protocol client;
    determining, by the network equipment, in response to the session initiation request, whether initiating the network configuration protocol session in parallel with a second network configuration protocol session that is associated with a second network configuration protocol server of a second service management and orchestration entity, other than the network configuration protocol session, would exceed a threshold number of parallel network configuration protocol sessions supported by a network function of a radio access network; and
    in response to a determination that initiating the network configuration protocol session in parallel with the at least one other network configuration protocol session would not exceed the threshold number of parallel network configuration protocol sessions supported by the network function, sending, by the network equipment, a confirmation of initiation of the network configuration protocol session to the network configuration protocol server of the first service management and orchestration entity.

2. The method of claim 1, wherein the network equipment comprises a controller implemented at the network equipment, and wherein the network function and the network configuration protocol client are also implemented at the network equipment.

3. The method of claim 2, wherein at least one other network configuration protocol client, other than the network configuration protocol client, is associated with the at least one other network configuration protocol session, and wherein the at least one other network configuration protocol client is also implemented at the network equipment.

4. The method of claim 1, wherein the network function comprises a central unit, a distributed unit, or a radio unit of the radio access network.

5. The method of claim 1, wherein
    in response to a determination that initiating the network configuration protocol session in parallel with the at least one other network configuration protocol session would exceed the threshold number of parallel network configuration protocol sessions supported by the network function, the network equipment is configured to send a rejection of the initiation of the network configuration protocol session to the network configuration protocol server of the first service management and orchestration entity.

6. The method of claim 1, further comprising:
    fetching, by the network equipment, policy information representative of a policy associated with the network configuration protocol server; and
    determining, by the network equipment, whether the policy conflicts with at least one other policy associated with the at least one other network configuration protocol session.

7. The method of claim 1, further comprising:
    assigning, by the network equipment, a priority to the network configuration protocol session; and
    assigning, by the network equipment, at least one other priority, other than the priority assigned to the network configuration protocol session, to the at least one other network configuration protocol session.

8. The method of claim 7, wherein the priority applies to a first time period and the at least one other priority applies to a second time period that is different from the first time period.

9. The method of claim 7, wherein the priority applies to a first network function parameter and the at least one other priority applies to a second network function parameter that is different from the first network function parameter.

10. The method of claim 1, further comprising:

propagating, by the network equipment, configuration state information between the network configuration protocol session and the at least one other network configuration protocol session.

11. The method of claim 1, further comprising:
adjusting, by the network equipment, the threshold number of parallel network configuration protocol sessions supported by the network function in response to a change in traffic load at the network function.

12. Network equipment, comprising:
at least one processor; and
at least one memory that stores executable instructions that, when executed by the at least one processor, facilitate performance of operations, comprising:
receiving, from a first network configuration protocol server of a first service management and orchestration entity, a session initiation request to initiate a network configuration protocol session between the first network configuration protocol server and a network configuration protocol client;
determining in response to the session initiation request, whether initiating the network configuration protocol session in parallel with a second network configuration protocol session that is associated with a second service management and orchestration entity, will exceed a threshold number of parallel network configuration protocol sessions supported by a network function of a radio access network; and
in response to a determination that initiating the network configuration protocol session in parallel with the at least one other network configuration protocol session will not exceed the threshold number of parallel network configuration protocol sessions supported by the network function, sending a confirmation of initiation of the network configuration protocol session to the network configuration protocol server of the first service management and orchestration entity.

13. The network equipment of claim 12, further comprising:
a controller implemented at the network equipment, wherein the network function and the network configuration protocol client are also implemented at the network equipment.

14. The network equipment of claim 13, wherein at least one other network configuration protocol client, other than the network configuration protocol client, is associated with the at least one other network configuration protocol session, and wherein the at least one other network configuration protocol client is also implemented at the network equipment.

15. The network equipment of claim 12, wherein the network function comprises a central unit, a distributed unit, or a radio unit of the radio access network.

16. The network equipment of claim 12, wherein the operations further comprise:
in response to a determination that initiating the network configuration protocol session in parallel with the at least one other network configuration protocol session will exceed the threshold number of parallel network configuration protocol sessions supported by the network function, sending a rejection of the initiation of the network configuration protocol session to the network configuration protocol server of the service management and orchestration first entity.

17. A non-transitory computer-readable medium comprising instructions that, in response to execution, cause network equipment comprising at least one processor to perform operations, comprising:
receiving, from a first network configuration protocol server of a first service management and orchestration entity, a session initiation request to initiate a network configuration protocol session between the first network configuration protocol server and a network configuration protocol client;
determining, in response to the session initiation request, whether initiating the network configuration protocol session in parallel with a second network configuration protocol session that is associated with a second service management and orchestration entity, is going to exceed a threshold number of parallel network configuration protocol sessions supported by a network function of a radio access network; and
in response to a determination that initiating the network configuration protocol session is not going to exceed the threshold number of parallel network configuration protocol sessions supported by the network function, sending a confirmation of initiation of the network configuration protocol session to the network configuration protocol server.

18. The non-transitory computer-readable medium of claim 17, wherein the operations further comprise:
fetching policy information representative of a policy associated with the network configuration protocol server; and
determining whether the policy conflicts with at least one other policy associated with the at least one other network configuration protocol session.

19. The non-transitory computer-readable medium of claim 17, wherein the operations further comprise:
assigning a priority to the network configuration protocol session; and
assigning at least one other priority, other than the priority assigned to the network configuration protocol session, to the at least one other network configuration protocol session.

20. The non-transitory computer-readable medium of claim 19, wherein the priority applies to a first time period and the at least one other priority applies to a second time period that is different from the first time period.

* * * * *